United States Patent Office 3,424,982
Patented Jan. 28, 1969

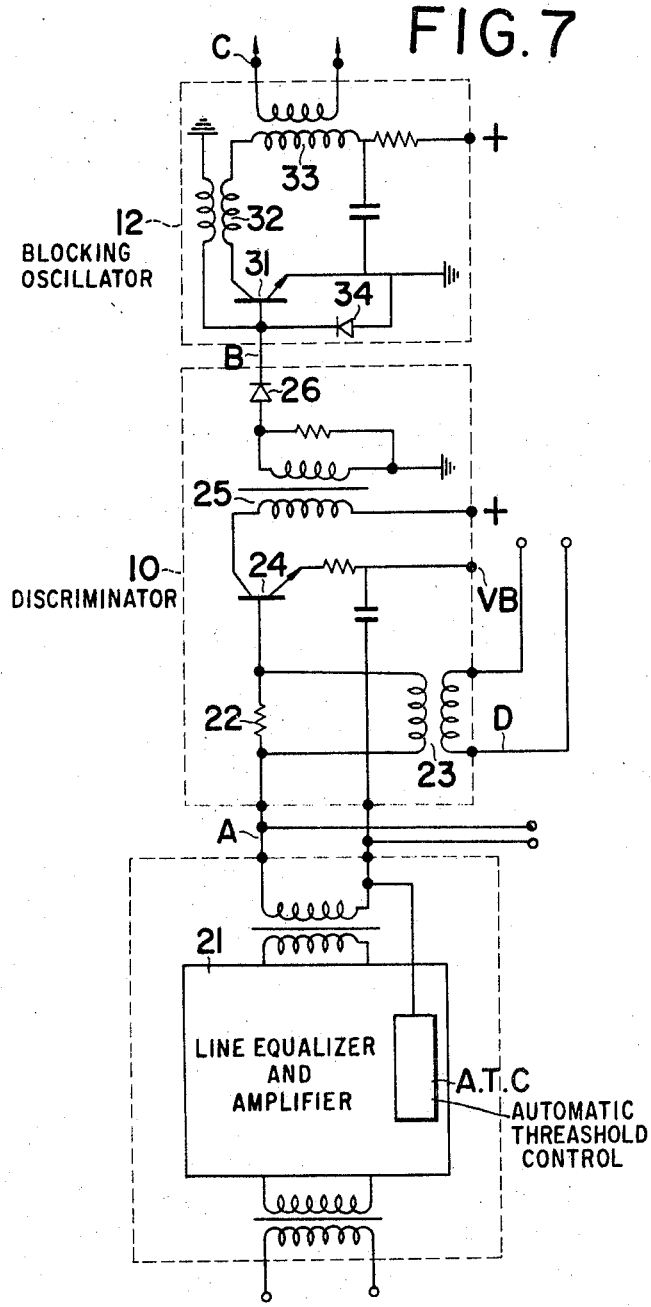
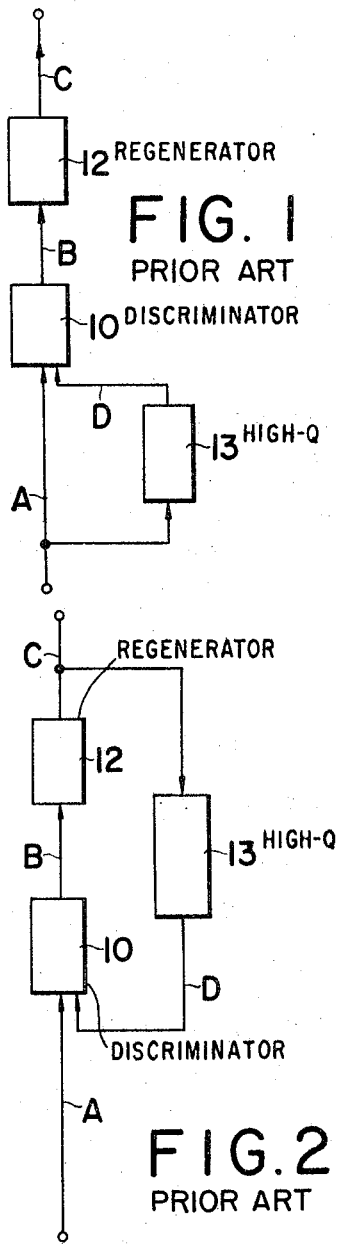

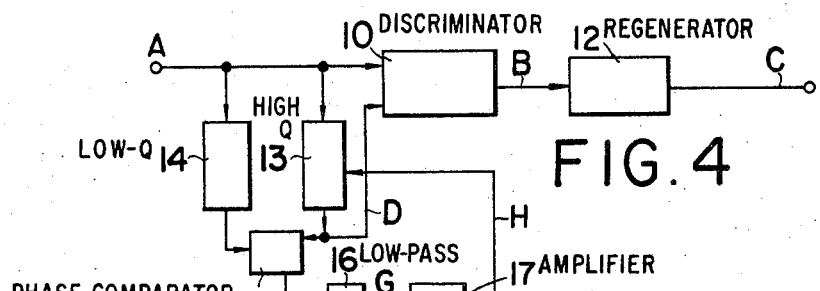
FIG. 4
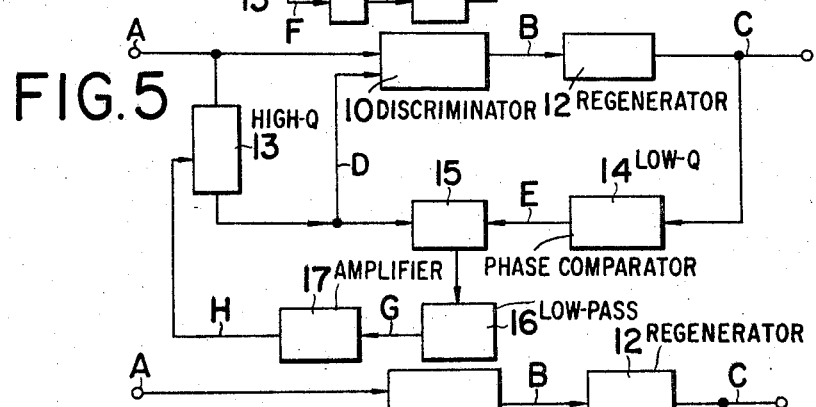
FIG. 5
FIG. 6
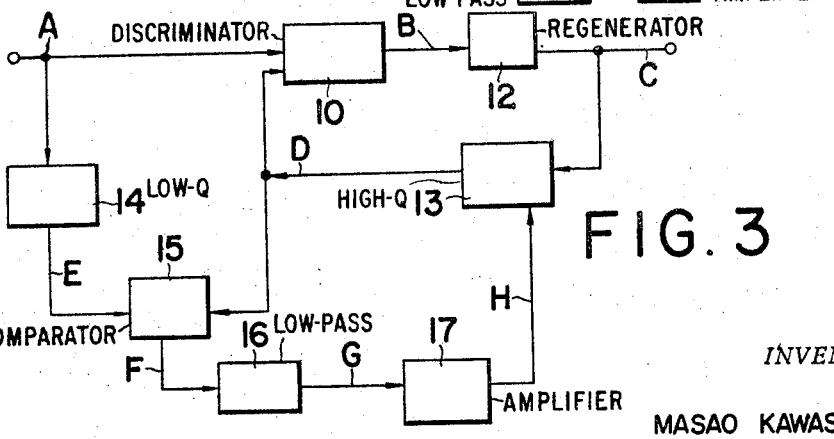
FIG. 3
INVENTORS
MASAO KAWASHIMA &
ISAO FUDEMOTO
BY KARL RATH
ATTORNEY

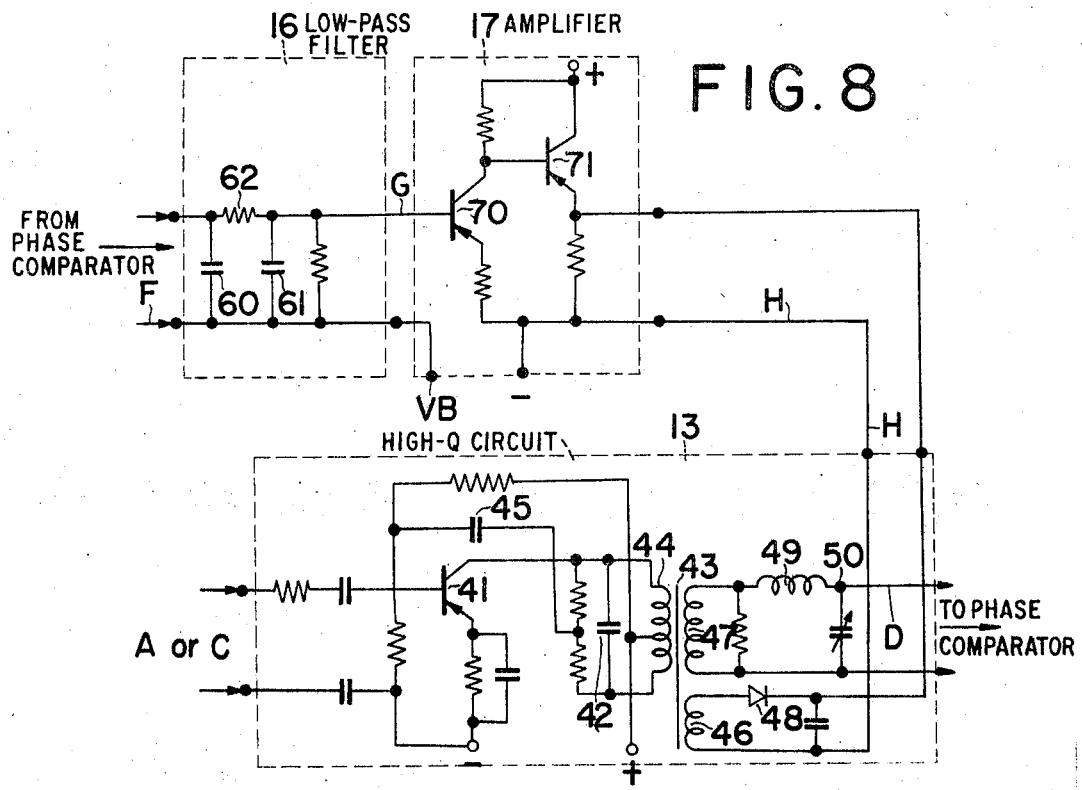
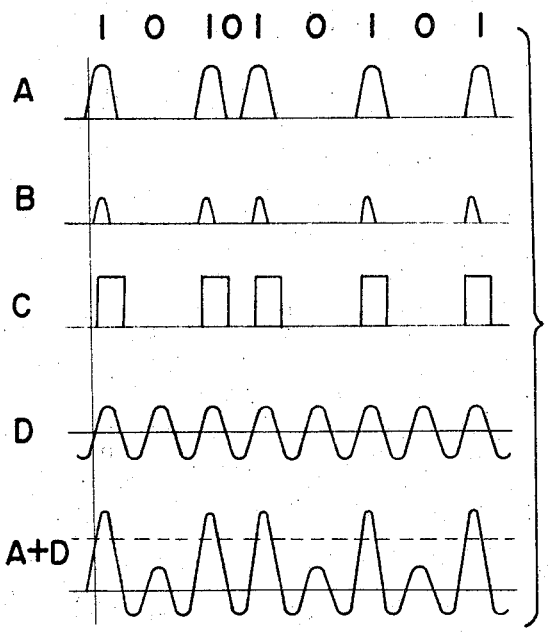

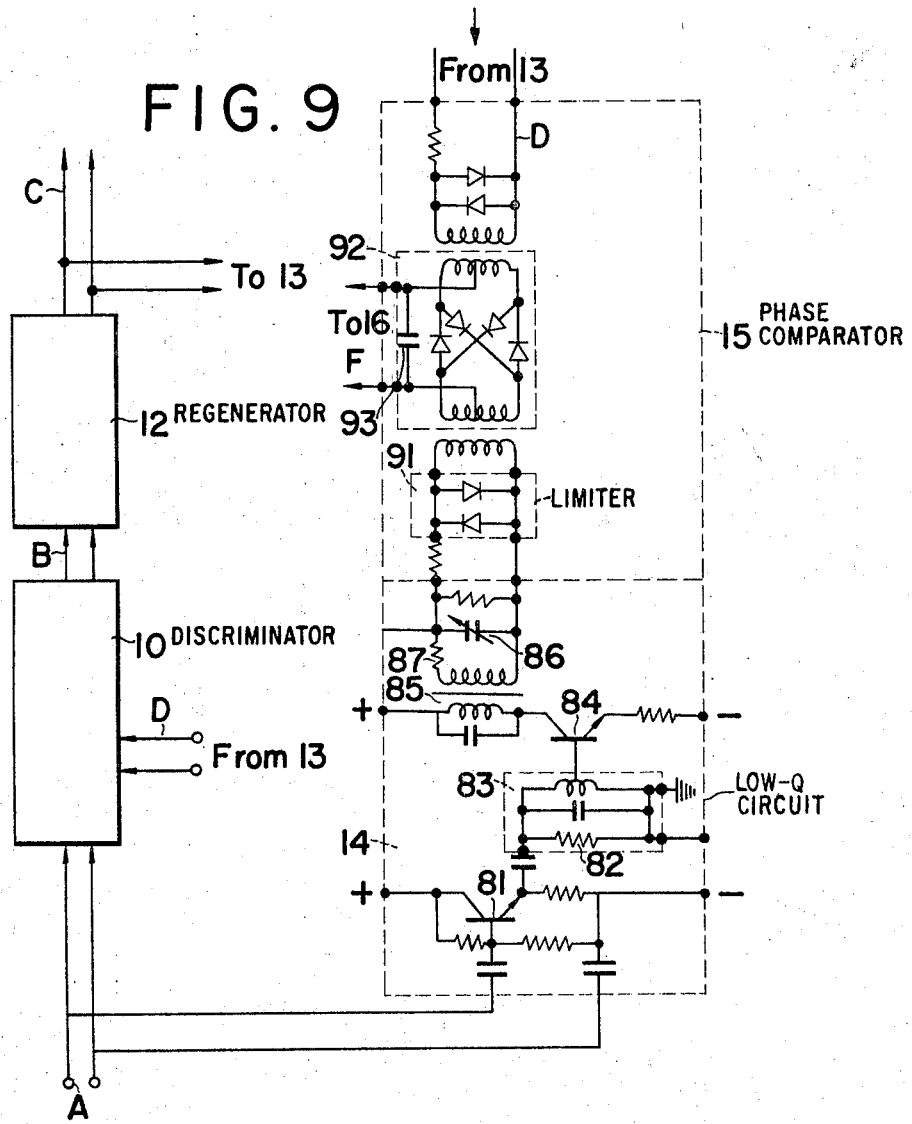
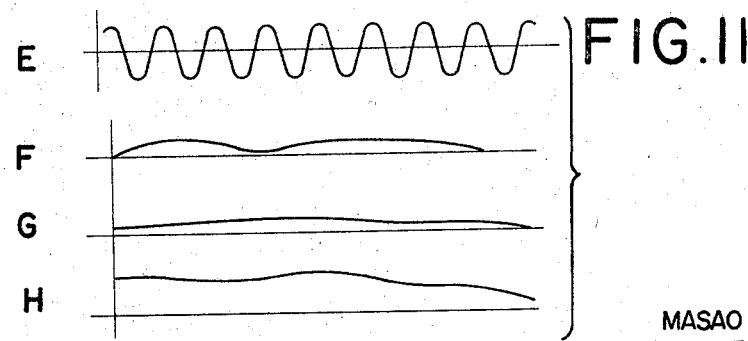

3,424,982
AUTOMATIC TIMING WAVE PHASE CONTROL FOR SELF-TIMED REGENERATIVE PULSE REPEATERS
Masao Kawashima and Isao Fudemoto, Kawasaki-shi, Kanagawa-ken, Japan, assignors to Fujitsu Limited, Kawasaki-shi, Kanagawa-ken, Japan
Filed Nov. 1, 1965, Ser. No. 505,917
Claims priority, application Japan, Oct. 31, 1964, 39/61,789
U.S. Cl. 325—13     9 Claims
Int. Cl. H04b 7/18

ABSTRACT OF THE DISCLOSURE

In a self-timed regenerative pulse repeater, the phase of a high-Q main timing filter, serving for the extraction in a known manner of a timing wave from the signal pulse train to be regenerated, is automatically controlled or stabilized by means of a control signal derived from the comparison of the phases of said wave and that of an auxiliary low-Q timing wave also extracted from said signal pulse train. The stabilized main timing wave and the signal pulse train are applied in a known manner to the regenerator, while the high-Q and low-Q timing waves, which may be derived from either the input or the output of the regenerator, are applied to the inputs of a phrase comparator the output signal of which is applied to a voltage-dependent phase control element, such as a variable junction diode, forming an effective part of the high-Q timing circuit, to stabilize the timing wave serving for the regeneration of the signal pulses by the automatic phase control.

---

This invention relates generally to improvements in and relating to self-timing regenerative pulse repeaters, espcially for use in the pulse code modulation system.

In the technique of information transmission by the utilization of pulse code modulation difficulties, are frequently encountered by noises and time jitters, the latter consisting in minor deviations in the mutual predetermined distances of the pulses being transmitted which are caused by electrical and/or magnetic fluctuations in the ambient conditions around the transmission line.

When the noises and/or time jitters exceed predetermined specific values, there may be distorted or misdelivered pulse information. The existence of such time jitters to some degree or other may also cause a kind of disadvantageous latent disorder in the signal information under transmission, and thus making it requisite to provide means to avoid possible accumulation of such disorder while the information is being transmitted through the line.

An conventional measure for minimizing such time jitters is to synchronize the phase of a locally provided timing signal source controlled by the basic repeated pulses with a mean of input information signal pulses before its application to a regenerative or independent pulse repeater, taken over a long extended time period. The mutual interval of the input signal pulses is controlled by the local timing or synchronizing signal, so as to obviate otherwise possible accumulation of time jitters. Conventional means utilized for this purpose are mainly in the form of a tuned circuit, narrow band filter or the like.

Difficulties may frequently be encountered by possible fluctuations in the circuit constants which are liable to occur as time goes, the nature of the difficulties to be more fully treated hereinafter.

It is the main object of the present invention to provide an improved regenerative pulse repeater, capable of substantially obviating the aforementioned difficulties caused by possible fluctuations in the circuit constants;

Another object is to provide an improved regenerative pulse repeater, capable of reducing time jitters to a possible minimum;

Still another object is to provide a regenerative pulse repeater which is highly stable and reliable in its operation and yet relatively simple in its design.

A more specific object of the invention is the provision of an automatic timing wave phase control system for a self-timed regenerative pulse repeater, enabling the use of a high-Q tuned circuit of filter for the extraction of the timing signals from the received signal pulses, to ensure a highly stable timing signal frequency and suppression of time jitter and the like interference, on the one hand, while maintaining a substantially constant timing wave phase, independently of spurious timing frequency variations caused by temperature, aging and the like effects.

These and further objects, features and advantages of the present invention will be better understood from the following detailed description taken in conjunction with the accompanying drawings, illustrating several preferred embodiments of the invention and in which:

FIG. 1 is a blosk diagram showing a conventional system for the regeneration of the synchronizing wave in a regenerative pulse repeater;

FIG. 2 is a second embodiment according to the conventional art, similar to that shown in FIG. 1;

FIG. 3 illustrates a first embodiment of the present invention in a simplified block diagram;

FIG. 4 is a similar view to FIG. 3, illustrating a second embodiment of the invention;

FIGS. 5 and 6 are block diagrams showing a third and a fourth embodiment of the invention, respectively;

FIGS. 7–9 are circuit diagrams, showing essential parts of the foregoing novel embodiments in greater detail; and FIGS. 10 and 11, the latter being the continuation of the former, are diagrams showing several wave forms by way of example, appearing at specific points in the foregoing figures.

Now referring to the accompanying drawings, especially FIG. 1 thereof, a conventional regenerative pulse repeater of the input drive type will be briefly described for better understanding of the inventon:

In this conventional arrangement, input pulses derived from the input side, denoted by A, and applied to a discriminator circuit 10 are fed to a narrow band filter 13 to be filtered therein, said filter being designed and constructed in such a manner that the central frequency of the filtering band is equal to the basic repetition frequency of the input signal pulses, and said filter being in the form of a sharply tuned circuit having a high sharpness constant or "Q," as known to those skilled in the art. In this way, local synchronizing or timing signals denoted by D in FIG. 1, wherein higher frequency jitters have been filtered off, may be obtained. Numeral 12 denotes the wave regenerating circuit prior.

In the second embodiment of the prior art shown in FIG. 2, signals are derived from the output side as at C of the wave regenerating circuit 12 and a local synchronizing or timing signal is formed as at D in the analogous way as before.

The narrow band pass filters employable in the aforementioned technique may be of the active or passive type and constructed in various ways, the simplest embodiment of which may be a tuned circuit as a representative example.

The higher frequency jitter suppressing characteristic of the aforementioned output drive, FIG. 2 system is superior to that of the corresponding input drive system, FIG. 1, provided that the tuned frequency of the system is in coincidence with the basic signal frequency. Especially in the range of relatively low frequencies of time jitters, there s a considerable difference between the two driving modes shown by FIGS. 1 and 2, respectively.

It can be said, based upon our experience, that with higher equivalent values of "Q," higher frequency jitters may be more effectively suppressed, and that under circumstances the suppressing effect will frequently extend to the lower frequency region of jitters when considering the whole region of the jitter spectrum.

When considering the deviation in the tuned frequency, it can be said without exaggeration that the input and the output drive system have substantially a similar effect upon the desirous jitter suppression, so far as conventionally attainable values by conventional tuned circuit arrangements of LC-type are concerned. It is further necessary that the time delay of the timing wave relative to the incoming signal information necessary for the synchronization of the latter by means of the former, should be kept at a constant for an extended period of operation of the repeater.

It may be found, however, that during an extended time period possible and inevitable changes in the electrical characteristics of circuit elements, such as coils, condensers and the like, caused by changes in ambient temperature and aging of circuit constants, may take place, resulting in a variation from the predetermined, tuned frequency and in a shift of the phase of the latter. For instance, a tuning frequency variation of about $\pm 10^{-3}$ cycles per second with temperature variation of $\pm 500°$ C. is frequently encountered, when conventional LC-tuned circuits are employed. In the following description, the change or alteration of electrical characteristics of the elements of the tuned circuit will be referred briefly to "the elemental change" for convenience.

According to our experience, the higher the Q-values of a tuned circuit, the more sensitive will become the alteration of the delay time relative to the frequency deviation caused by the elemental change. Furthermore, in the case of the output drive system, shown by way of example in FIG. 2, the circuit loop 10–12–13–10 constitutes a positive feedback loop in considering the changes of the delay time in the timing circuit 13, and thus the operation will become still further unstable. Additionally, in the case of the output drive system, especially when the tuned circuit has a higher Q-value, difficulties may be frequently encountered in ensuring a coincidence of the phase of the input signal with that of the timing wave, whereby the starting time period, or more specifically the time from the reception of an input pulse to the starting of the regular operation of the regenerative repeater will become longer, especially when the tuner has been prematurely brought into oscillation by occasional slight noise frequencies, such as cross-talk and the like entering from outside into the transmission line prior to the regular starting operation of a signal transmission. More particularly, when a synchronizing oscillator is utilized as the aforementioned tuned circuit, the disadvantageous effect of occasional noise frequencies may be so predominant that failure of operation of the repeater may result therefrom.

Next, referring to FIG. 3, a first embodiment of the present invention will be described in detail.

Numeral 14 denotes a tuned circuit having a lower $Q_1$ or sharp tuning coefficient, say 30–100 to which a series of input pulses is fed from the input A, an example of this input pulse series being shown in the uppermost line A of FIG. 10. From the circuit 14, a timing signal E, FIG. 11 is delivered and fed to a phase comparator 15. On the other hand, the input pulses are processed by discriminator 10 and regenerator 12 and then fed through the output C to a tuned circuit 13 having a higher coefficient $Q_2$ of sharp tuning, say 100–5000. The outputs from the discriminator and the regenerator are shown by way of example at B and C of FIG. 10. The output timing signal from the second tuned circuit 13 which is shown in FIG. 10 at D, is also fed to comparator 15. The phase difference signal between the both signals D and E as detected by the comparator 15 is filtered by a low pass filter 16 and then amplified by an amplifier 17, the respective outputs being shown in FIG. 10 at F and G. The output signal from the amplifier is utilized as control signal H, FIG. 11, to be fed to the second tuned circuit 13 to control the tuning frequency thereof for compensating possible elemental changes in the circuit.

Assuming that the highest possible tuned frequency caused to appear by the elemental change to be $f_r$, the choke frequency of filter 16 to be $f_c$ and the basic input signal frequency be $f_o$, the dimensions and arrangement of filter 16 and the second tuned circuit 13 should preferably be adjusted so as to satisfy the following mathematical condition:

$$f_r < f_c < f_o/Q_2$$

Further, the frequency control mechanism comprising comparator 15, filter 16, amplifier 17 and second tuner 13 must be designed so as to provide enough high gain in the loop 15–16–17–13–15. By employing both the above measures, possible variation in time delay of the output signal from the tuner 13 at D, which may be caused to appear by the elemental change therein, can be made substantially equal to the corresponding variation which may appear in the first tuner 14.

Since the suppression of high frequency jitters can be achieved, in the above embodiment, by the second tuner having a high tuning sharpness, and the possible variation of tuning frequency of the tuner is suppressed in the aforementioned manner, the necessary time delay set forth hereinbefore can be highly stabilized and thus the phase stability of the repeatedly processed line signal pulses increased in comparison with the prior art.

Modified arrangements using same circuit components as before are shown in FIGS. 4–6, respectively. The basic principles embodied in these modified arrangements are substatnially same as before so that any person skilled in the art may understand the nature and function of these modifications.

More specifically, in FIG. 4, both High-Q and Low-Q circuits are fed from the input A, in FIG. 5 the High-Q circuit is fed from the input A and the Low-Q circuit is fed from the output C, while in FIG. 6 both High-Q and Low-Q circuits are fed from the output C of the regenerator.

However, for still better understanding of the invention, the foregoing several modifications will be more fully described hereinbelow in reference to FIGS. 7–9 showing detailed circuit components.

Referring to FIG. 7, a PCM-signal, PCM being an abbreviation of "pulse code modulation," transmitted from a conventional transmission line is fed to a line equalizer and amplifier unit, shown simply by a block 21, so as to equalize the conventionally appearing line distortion, and then amplified to a sufficient degree necessary for the following stages to be described. This processed and amplified signal is fed through the input lead A to both the discriminator 10 and the High-Q tuned circuit 13, if the arrangement is according to FIG. 4. As for the tuned circuit 13, detailed description will be given in referrence to FIG. 8. The PCM-signal is fed through a resistor 22 to the base electrode of transistor 24, a sinusoidal output signal derived from the tuner 13 through lead D and transformer 23 being added to said signal. The wave form of this combined signal is shown in FIG. 10 at $(A+D)$. To the emitter electrode of the transistor, a constant voltage $V_B$ is impressed as conventionally. This transistor is so designed and adjusted that it amplifies only higher voltage signals than a certain specified value which is determined by the function of an ATC (abbreviation of automatic threshold control circuit) shown in FIG. 7 in a simplified block form. As follows from $(A+D)$, FIG. 10, when a PCM-signal representing the state of "1" in the meaning of binary technique is added to the aforementioned sinusoidal output, the transistor 24 will function to amplify, while it does not operate in the case where a signal of "0" is combined with the sinusoidal wave. The combined signal, if any, is fed through a transformer 25 and diode 26 to the next stage or wave regenerator 12 which is in effect a blocking oscillator, comprising a transistor 31, the collector and base electrodes of which are coupled with each other by a transformer 31 to provide positive feedback. There is provided a second diode 34 inserted between the said both electrodes for protection. The provision of first diode 26 serves to effect a unidirectional feed of the combined signal from the discriminator 10 to regenerator 12. The output signal from the discriminator has thus the same sign with that of PCM-signal which has been transmitted to the input lead A, and harmful jitters have been removed therefrom. The output or regenerated PCM-signal delivered from this blocking oscillator is shown in FIG. 10 at C.

In FIG. 8, blocks 13, 16 and 17 of FIG. 3 are specifically illustrated in greater detail. The legend A or C is to denote two cases or variations: In the first case, input lead A is connected to the circuit 13, corresponding to FIG. 4, while, in the second case, output lead C is connected to the same circuit, corresponding to any one of FIGS. 3, 5 and 6. The circuit 13 is a synchronizing oscillator as a preferred and representative embodiment, comprising a transistor 41; a tuning circuit having tuning elements 42 and 44; and a feedback condenser 45.

When the tuned frequency thus determined is in close proximity with the bit frequency of the PMC input signal, the oscillator will function to oscillate in accordance with the bit frequency, as is commonly known. If the tuning elements 42 and 44 are selected to have a high sharpness or Q-value, a sinusoidal output having a constant phase will be delivered from an output coil 47 through a transformer 43, in spite of possible jitters accompanied with the input PCM-signal. The output signal is adjusted in its phase relationship by passing through a phase shifter comprising an inductance 49 and a semi-stationary, yet adjustable condenser 50 and then fed through lead D to phase comparator 15 which will be further described more in detail with reference to FIG. 9. This output signal is shown in FIG. 10 at D.

Possible variation of electrical characteristic, such as tuning frequency or the like, of the circuit comprising circuit elements 42 and 44 due to occasional alterations in the ambient field, are corrected by a control circuit comprising a coil 46 and a variable capacity diode 48. The output signal fed through lead F from the phase comparator 15 which will be more fully described with reference to FIG. 9, to low pass filter 16 which comprises condensers 70 and 71 and resistor 72, the limit frequency of the filter being selected to be a certain value, $f_c$, as was already referred to. When assuming the maximum variable frequency of the tuned circuit 42, 44 to be $f_r$, the desired relation: $f_r < f_c$ will be always kept maintained. For this reason, D.C. voltage waves fed from the comparator or detector 15 and containing higher frequency components may be removed by passing said waves through the low pass filter. The D.C. output voltage as shown in FIG. 10 at G is applied to amplifier 17, wherein it is amplified by transistor 70 and processed by a further transistor 81 so as to form a low impedance source. More specifically, transistor 71 has its collector electrode earthed and the output is to be taken from its emitter, thus forming an emitter follower circuit of well known design. It will thus be easily understood that the output impedance of such transistor has a relatively low value.

The amplifier signal is shown by way of example in FIG. 10 at H. This D.C. signal is fed through lead H to the synchronizing oscillator including diode 48. This diode 48 is of variable capacity type, whereby its capacity varies with changes in a reverse current voltage applied thereto. It will be clear from the foregoing that the characteristic of the tuned circuit contained in the synchronizing oscillator is varied by means of the correction circuit comprising coil 46 and variable capacity diode 48 and in accordance with the D.C. signal supplied through lead H.

Finally, referring to FIG. 9, the transmitted PCM signal is fed from inlet lead A to a transistor 81 of the tuned circuit 14 of relatively low Q-value, the collector electrode of said transistor being connected to earth, whereby the fed signal is transformed into a low impedance one. Resonance circuit 83 contained in the block 14 is provided with a resistor 82 for lowering considerably the Q-value of the resonance circuit which thus delivers a nearly sinusoidal signal output, as shown by way of example in FIG. 10 at E. This output signal is amplified by a further transistor 84 and, after being passed through a transformer 85, is subjected to a phase adjustment by means of the combination of a semi-stationary, yet adjustable condenser 86 with an inductance 87. The signal is then fed to a limiter 91 comprising a pair of diodes and contained in the phase comparator or detector 15, so as to limit the amplitudes to a certain value, whereupon it is fed to a comparator proper 92, to which the output signal from the high Q-value circuit 13 is also supplied for phase comparison in the manner described. If there should be no phase difference between the both signals fed from blocks 13 and 14, the output from the comparator 15 will become zero. On the other hand, if there should be such a phase difference of the above kind, a phase difference output will be fed through lead F to low pass filter 16, FIG. 8, the wave of this delivered signal being shown in FIG. 10 at F. From this wave form, it could be clearly seen that disadvantageous high frequency components have been removed from the thus processed signal.

It will be understood that modifications and variations disclosed herein may be resorted to without departing from the scope of the concepts of the present invention. Therefore, the scope of the invention should be limited only by the scope and proper interpretation of the claims appended hereto.

What we claim as new and desire to protect by Letters Patent is:

1. In a self-timed regenerative pulse repeater including a regenerator having a pair of inputs and an output with means for applying a signal pulse train and a timing wave to said inputs, to produce regenerated pulses in said output, a timing wave producing system comprising in combination:
    (1) a first relatively high-Q resonant circuit tuned to the pulse repetition frequency of and excited by said signal pulse train, to produce a first timing wave,
    (2) means to apply said timing wave to one of the inputs of said regenerator,
    (3) a second relatively low-Q resonant circuit also tuned to the pulse repetition frequency and excited by said signal pulse train, to produce a second timing wave,
    (4) a phase comparator having a pair of inputs and an output with means for applying to said inputs said first and second timing waves, and
    (5) means including stabilizing filter means to control the phase of said high-Q circuit by the output control signal of said comparator.

2. Pulse repeater as set forth in claim 1, further comprising a low-pass filter operatively connected between said comparator and said first resonant circuit and delivering amplitude-limited output to said circuit.

3. Phase repeater as set forth in claim 2, further comprising an amplifier inserted between said filter and said first resonant circuit for delivering amplified output of said filter to said circuit.

4. In a self-timed regenerative pulse repeater as claimed in claim 1, wherein said main and auxiliary timing waves are derived, respectively, from the output and input of said regenerator.

5. In a self-timed regenerative pulse repeater as claimed in claim 1, wherein said main and auxiliary timing waves are derived, respectively, from the input and the output of said regenerator.

6. In a self-timed regenerative pulse repeater as claimed in claim 1, wherein both said main and auxiliary timing waves are derived from the input of said regenerator.

7. In a self-timed regenerative pulse repeater as claimed in claim 1, said repeater comprising a discriminator producing coincidence pulses from said signal pulses and the timing pulses derived by said high-Q circuit, and a one-shot pulse generator controlled by said coincidence pulses.

8. In a self-timed regenerative pulse repeater as claimed in claim 7, said generator consisting of a one-shot blocking oscillator.

9. In a self-timed regenerative pulse repeater as claimed in claim 7, said discriminator including an amplitude limiter, to produce output pulses exceeding a predetermined limit of the input signals only.

References Cited

UNITED STATES PATENTS

| | | | |
|---|---|---|---|
| 3,086,080 | 4/1963 | Raisbeck | 179—15 |
| 2,942,196 | 6/1960 | DeLange | 328—164 |
| 2,627,574 | 2/1953 | Feldman | 179—15 |

ROBERT L. GRIFFIN, *Primary Examiner.*

RICHARD MURRAY, *Assistant Examiner.*

U.S. Cl. X.R.

328—164